(12) United States Patent
Fingerle (10) Patent No.: US 9,174,884 B1
(45) Date of Patent: Nov. 3, 2015

(54) CLOSED LOOP COMPOST TEA BREWER

(71) Applicant: Matthew Fingerle, Fort Wayne, IN (US)

(72) Inventor: Matthew Fingerle, Fort Wayne, IN (US)

( * ) Notice: Subject to any disclaimer, the term of this patent is extended or adjusted under 35 U.S.C. 154(b) by 0 days.

(21) Appl. No.: 14/585,784

(22) Filed: Dec. 30, 2014

Related U.S. Application Data (60) Provisional application No. 62/017,391, filed on Jun. 26, 2014.

(51) Int. Cl.
| C12M 3/00 | (2006.01) |
| C05F 9/00 | (2006.01) |
| C05F 17/02 | (2006.01) |
| C05F 11/00 | (2006.01) |

(52) U.S. Cl.
CPC ............. *C05F 17/0276* (2013.01); *C05F 11/00* (2013.01); *C05F 17/027* (2013.01)

(58) Field of Classification Search
CPC ...... C12M 21/02; C12M 43/00; C12M 23/58; C05F 9/02; C05F 17/0018
See application file for complete search history.

(56) References Cited

U.S. PATENT DOCUMENTS

| 6,649,405 B2 | 11/2003 | Alms et al. |
| 6,727,090 B1 | 4/2004 | Hronek |
| 6,767,381 B2 | 7/2004 | Huhn |
| 7,727,758 B1 | 6/2010 | Posthuma |
| 7,785,866 B2 | 8/2010 | Winslow et al. |
| 7,972,839 B2 | 7/2011 | Wilson |
| 2003/0113908 A1 | 6/2003 | Hussey, III et al. |
| 2004/0032032 A1* | 2/2004 | Erickson ......................... 261/93 |
| 2006/0084166 A1 | 4/2006 | Appel |
| 2007/0059819 A1 | 3/2007 | Storch |
| 2009/0191613 A1 | 7/2009 | Wilson |
| 2010/0236308 A1* | 9/2010 | Gunn et al. ....................... 71/11 |
| 2012/0064618 A1 | 3/2012 | Winslow |
| 2012/0137977 A1* | 6/2012 | Hermes et al. ................. 119/6.5 |
| 2012/0252107 A1* | 10/2012 | Self ................................. 435/267 |
| 2014/0004589 A1* | 1/2014 | Zaid ............................... 435/167 |
| 2014/0137468 A1* | 5/2014 | Ching ................................ 47/17 |
| 2014/0138407 A1* | 5/2014 | Thompson et al. ........... 222/133 |

OTHER PUBLICATIONS

Grow Boxes / Grow Room ; Hydroponic Grow Systems; http://supercloset.com/product/grow-boxs/deluxe-grow-box/.

* cited by examiner

*Primary Examiner* — Nathan Bowers
(74) *Attorney, Agent, or Firm* — Barnes * Thornburg LLP (57) ABSTRACT

A closed loop compost tea brewing system with a hydroponic reservoir and a compost tea brewing assembly configured to brew compost tea. The compost tea brewer assembly includes a tea brewing reservoir. The system includes has a closed loop arrangement fluidly connecting the tea brewing reservoir and the hydroponic reservoir. The closed loop arrangement is configured to provide continuous fluid flow from the tea brewing reservoir to the hydroponic reservoir, which is recirculated back from the hydroponic reservoir to the tea brewing reservoir.

18 Claims, 13 Drawing Sheets

CLOSED LOOP COMPOST TEA BREWER

RELATED APPLICATIONS

The present application claims the benefit of U.S. Provisional Application Ser. No. 62/017,391, filed Jun. 26, 2014, which is hereby incorporated by reference in its entirety.

TECHNICAL FIELD

The present disclosure relates generally to hydroponic gardening; in particular, this disclosure relates to a compost tea brewing system for supplying a nutrient-enhanced liquid to the plants.

BACKGROUND AND SUMMARY

Hydroponic gardening is gaining popularity. This type of gardening differs over traditional soil gardening in that a growing medium is used instead of soil. There are substantial benefits to hydroponic gardening in that considerably less water is used compared to soil gardening because nutrient solutions can be reused.

One manner by which nutrient solutions are enhanced is through compost. In particular, the use of compost tea in conjunction with hydroponic gardening is a well-known technique for enhancing the nutrients supplied to plants. To brew compost tea, compost is steeped in water for an extended period of time, such as 24 to 48 hours. After the compost tea has steeped for a sufficient period of time, the tea is strained from the compost and supplied to the plants.

However, there are significant shortcomings to traditional compost tea brewing devices. The brewing of compost tea takes an extended period of time and can go bad if not used shortly after the brew has completed. This slows the process of dispensing nutrients to the plants and creates timing complexity. Additionally, it can be difficult to clean compost tea brewing containers after use. Accordingly, there is a need for a new system that allows compost tea to be delivered more quickly and in a more efficient manner.

According to one aspect, this disclosure provides a closed loop compost tea brewing system. The system includes a hydroponic reservoir and a compost tea brewing assembly configured to brew compost tea. The compost tea brewing assembly includes a tea brewing reservoir fluidly connected to the hydroponic reservoir and configured to provide compost tea within the compost tea brewer to the hydroponic reservoir. The hydroponic reservoir is fluidly connected to the tea brewing reservoir and is configured to provide liquid within the hydroponic reservoir to the compost tea brewing reservoir. In some embodiments, the tea brewing reservoir is arranged with respect to the hydroponic reservoir to dispense compost tea into the hydroponic reservoir using hydrostatic pressure. In some cases, at least one pump configured to pump liquid within the hydroponic reservoir to the tea brewing reservoir. Embodiments are contemplated in which a level switch is associated with the tea brewing reservoir. The level switch is configured to turn off the pump if a level within the tea brewing reservoir rises to a predetermined level.

According to a further aspect, this disclosure provides a closed loop compost tea brewing system with a hydroponic reservoir and a compost tea brewing assembly configured to brew compost tea. The compost tea brewer assembly includes a tea brewing reservoir. The system includes has a closed loop arrangement fluidly connecting the tea brewing reservoir and the hydroponic reservoir. The closed loop arrangement is configured to provide continuous fluid flow from the tea brewing reservoir to the hydroponic reservoir and recirculate fluid from the hydroponic reservoir back to the tea brewing reservoir.

According to yet another aspect, this disclosure provides a method of enhancing nutrients in a hydroponic feed system. The method includes the step of filling a tea brewing reservoir and a hydroponic reservoir with a liquid. A quantity of compost is supplied to the tea brewing reservoir. Compost tea is dispensed from the tea brewing reservoir to the hydroponic reservoir. Liquid from the hydroponic reservoir is recirculated to the tea brewing reservoir to form a closed loop.

According to a further aspect, this disclosure provides a closed loop compost tea brewing system with a compost tea brewing assembly and a hydroponic feed system. The compost tea brewing system is configured to brew compost tea and includes a tea brewing reservoir with an inlet and an outlet. The hydroponic feed system also has an inlet and an outlet. The inlet of the hydroponic feed system is in fluid communication with the outlet of the tea brewing reservoir to supply compost tea to the hydroponic feed system. The outlet of the hydroponic feed system is in fluid communication with the inlet of the tea brewing reservoir to recirculate fluid from the hydroponic feed system to the tea brewing assembly. The fluid communication between the outlet of the tea brewing reservoir and the inlet of the hydroponic feed system is either: (1) a direct connection; or (2) an indirect connection with one or more devices interposed between the tea brewing reservoir and the hydroponic feed system. Likewise, the fluid communication between the outlet of the hydroponic feed system and the inlet of the tea brewing reservoir is either: (1) a direct connection; or (2) an indirect connection with one or more devices interposed between the hydroponic feed system and the tea brewing reservoir. In some cases, the closed loop compost tea brewing system includes a rain water collection tank in fluid communication with the inlet of the tea brewing reservoir. A float valve controls flow between the rain water collection tank and the tea brewing reservoir so that float valve is configured to open when a fluid level within the tea brewing reservoir falls below a threshold level and closes when the fluid level within the tea brewing reservoir rises to a threshold level. In some embodiments, a pump is provided for supplying fluid from the tea brewing reservoir to hydroponic feed system, which is controlled based on a timed schedule to conserve energy.

Additional features and advantages of the disclosure will become apparent to those skilled in the art upon consideration of the following detailed description of the illustrated embodiment exemplifying the best mode of carrying out the disclosure as presently perceived. It is intended that all such additional features and advantages be included within this description and be within the scope of the disclosure.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Figure 1:
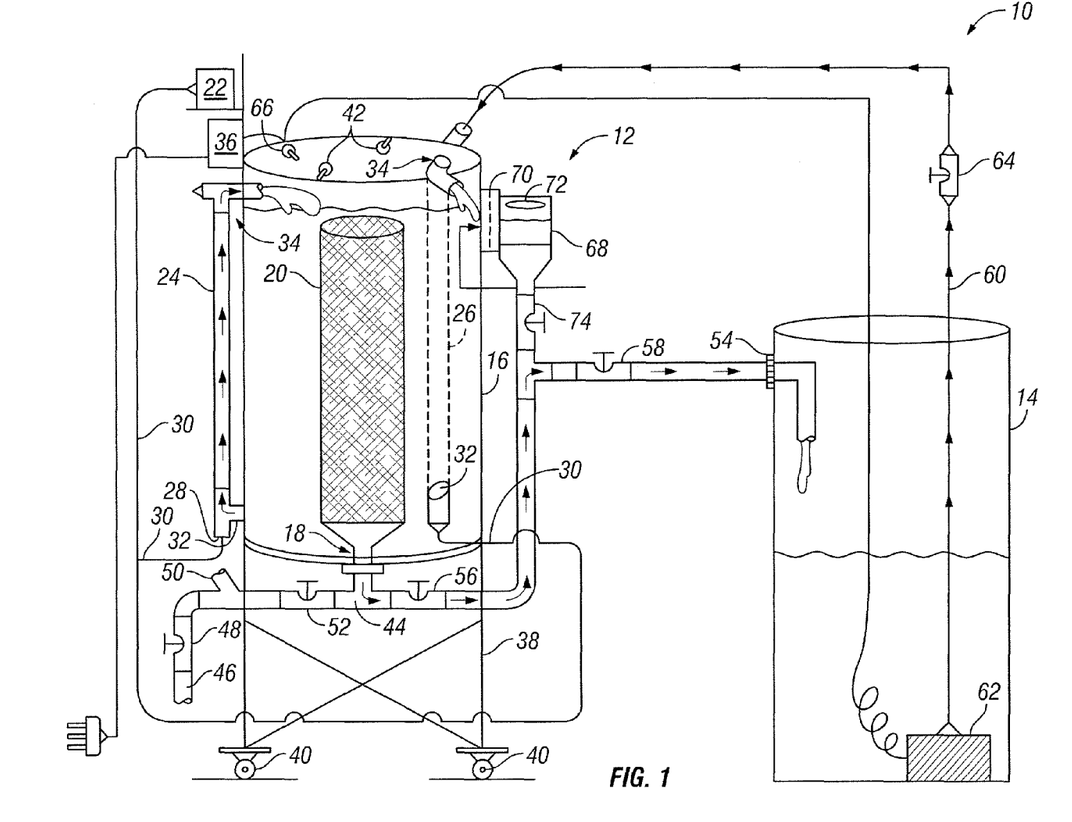
FIG. 1 is a diagrammatic view of a closed loop compost tea brewing system according to an embodiment of the disclosure.

FIG. 1 shows an example closed loop compost tea brewing system 10 according to an embodiment of the disclosure. As shown, the system includes a compost tea brewing assembly 12 and a hydroponic reservoir 14. As shown, there is a continuous flow from the compost tea brewing assembly 12 to the hydroponic reservoir 14, which is recirculated back to the compost tea brewing assembly 12. With this arrangement, the compost tea brewing assembly 12 acts in concert with the hydroponic reservoir 14 in a closed loop arrangement.

In the example shown, the compost tea brewing assembly 12 includes a tea brewing reservoir 16 that defines an interior volume for holding a quantity of compost and water for brewing compost tea. In one embodiment, the tea brewing reservoir 16 may be a 55 gallon container that could be formed from a number of different materials, such as a thermal plastic (e.g., HDPE or PEHD) or metal. In the example shown, the tea brewing reservoir 16 has an open top end and a lower end with a port 18 through which water may be added to the tea brewing reservoir 16 or through which compost tea may be discharged out of the tea brewing reservoir 16. In the example shown, a filter 20 has an outlet connected to the port 18. In the example shown, the filter 20 has a multiplicity of holes in circumferential walls through which nutrient enhanced liquid may enter the filter 20 and exit the tea brewing reservoir 16 through the port 18. However, the filters 20 blocks particulate for the compost from entering the port 18, which may clog the system 10. In this example, the filter 20 has a generally cylindrical shape with an open top end and a conically-shaped lower end to terminate into the port 18. In some embodiments, the filter 20 could be formed from a PVC pipe. However, one skilled in the art should appreciate that various filters could be used to prevent particulate suspended in the tea brewing reservoir 16 from entering the port 18.

In the example shown, the tea brewing reservoir 16 includes an optional aerating assembly. As shown, the aerating assembly includes an air pump 22 that is in fluid communication with a first aerating pipe 24 and a second aerating pipe 26. The pipes 24, 26 force air into the lower portion of the tea brewing reservoir 16 to agitate compost for even distribution.

In the example shown, the first aerating pipe and the second aerating pipe have a lower end 28 to which the air pump 22 is connected with a tube 30. The first aerating pipe in 24 and second aerating pipe 26 are in fluid communication with the interior of the tea brewing reservoir 16. As shown, the first aerating pipe 24 and second aerating pipe 26 have a lower connection 32 that is in fluid communication with the interior of the tea brewing reservoir 16 and an upper connection 34 in fluid communication with the interior of the tea brewing reservoir 16 to discharge aerated liquid into the tea brewing reservoir 16. The air pump 22 is in electrical communication with an electrical box 36, which is connected to a power supply. With the air pump 22 turned on, air is injected into the lower end 28 of the aerating pipes 24, 26 such that liquid from the tea brewing reservoir 16 flows upwardly in the pipes 24, 26 and is discharged into the tea brewing reservoir 16 at the upper connection 34.

In the example shown, the tea brewing reservoir is elevated by a platform 38. In this example, the platform 38 is carried by wheels 40, which could be caster wheels, to allow mobility to the compost tea brewing assembly 12.

In the embodiment shown, the tea brewing reservoir 16 includes a plurality of eye bolts 42. The eye bolts 42 could be used to suspend a compost bag filter for holding compost or for other uses.

In the example shown, the port 18 is in fluid communication with a pipe 44. The pipe 44 includes a discharge end 46 through which compost tea in the tea brewing reservoir 16 could be discharged to another container for transport and/or the liquid in the tea brewing reservoir 16 and/or hydroponic reservoir 14 could be emptied. As shown, a discharge valve 48 controls flow of liquid through the pipe 44 out the discharge end 46. An inlet port 50 is in fluid communication with the pipe 44. As explained below, this allows filling of the hydroponic reservoir 14 and/or tea brewing reservoir 16 from an external water source. An inlet valve 52 controls water flow from the inlet port 50 through the pipe 44.

The pipe 44 provides fluid communication between the tea brewing reservoir 16 and the hydroponic reservoir 14. In the example shown, the pipe 44 is received through an inlet port 54 of the hydroponic reservoir 14 to deliver liquid flowing from the pipe 44 into the hydroponic reservoir 14. This flow allows nutrients in the tea brewing reservoir 16 to be gradually released to the hydroponic reservoir, which provides nutrients to the hydroponic reservoir 14 all of stages of compost decomposition to be released. This stands in contrast to conventional compost brewers in which compost tea is extracted at 1 time at the end of the brew process. In the example shown, a first outlet valve 56 and a second outlet valve 58 control flow through the pipe 44 between the tea brewing reservoir 16 and the hydroponic reservoir 14. The valves 56, 58 allow the flow between the tea brewing reservoir 16 and the hydroponic reservoir 14 to be selected by the user. If the user wants to disconnect flow between the hydroponic reservoir 14 and tea brewing reservoir 16, valve 58 could be closed.

A return tube 60 provides fluid communication between the hydroponic reservoir 14 and the tea brewing reservoir 16. This allows a liquid in the hydroponic reservoir 14 to be pumped using a pump 62 from the hydroponic reservoir 14 to the tea brewing reservoir 16 which completes the closed loop arrangement of the system 10. In this example, a return valve 64 allows the user to select the flow rate between the hydroponic reservoir 14 and the tea brewing reservoir 16.

In the embodiment shown, a level switch 66 controls the water pump 62 to prevent overflow in the tea brewing reservoir 16. Once the level within the tea brewing reservoir 16 reaches the level switch 66, the level switch will switch off the pump 62, thereby stopping the flow of liquid from the hydroponic reservoir 14 to the tea brewing reservoir 16.

In the embodiment shown, a skimmer 68 is connected in fluid communication with the tea brewing reservoir 16. As shown, the skimmer 68 includes a filter 70 which prevents particles in the tea brewing reservoir 16 from flowing into the skimmer 68. In this example, the skimmer 68 includes an access port 72 from which samples of the liquid in the tea brewing reservoir 16 could be obtained for sampling. In the example shown, a valve 74 controls flow from the skimmer 68 into the pipe 44.

Figure 2:
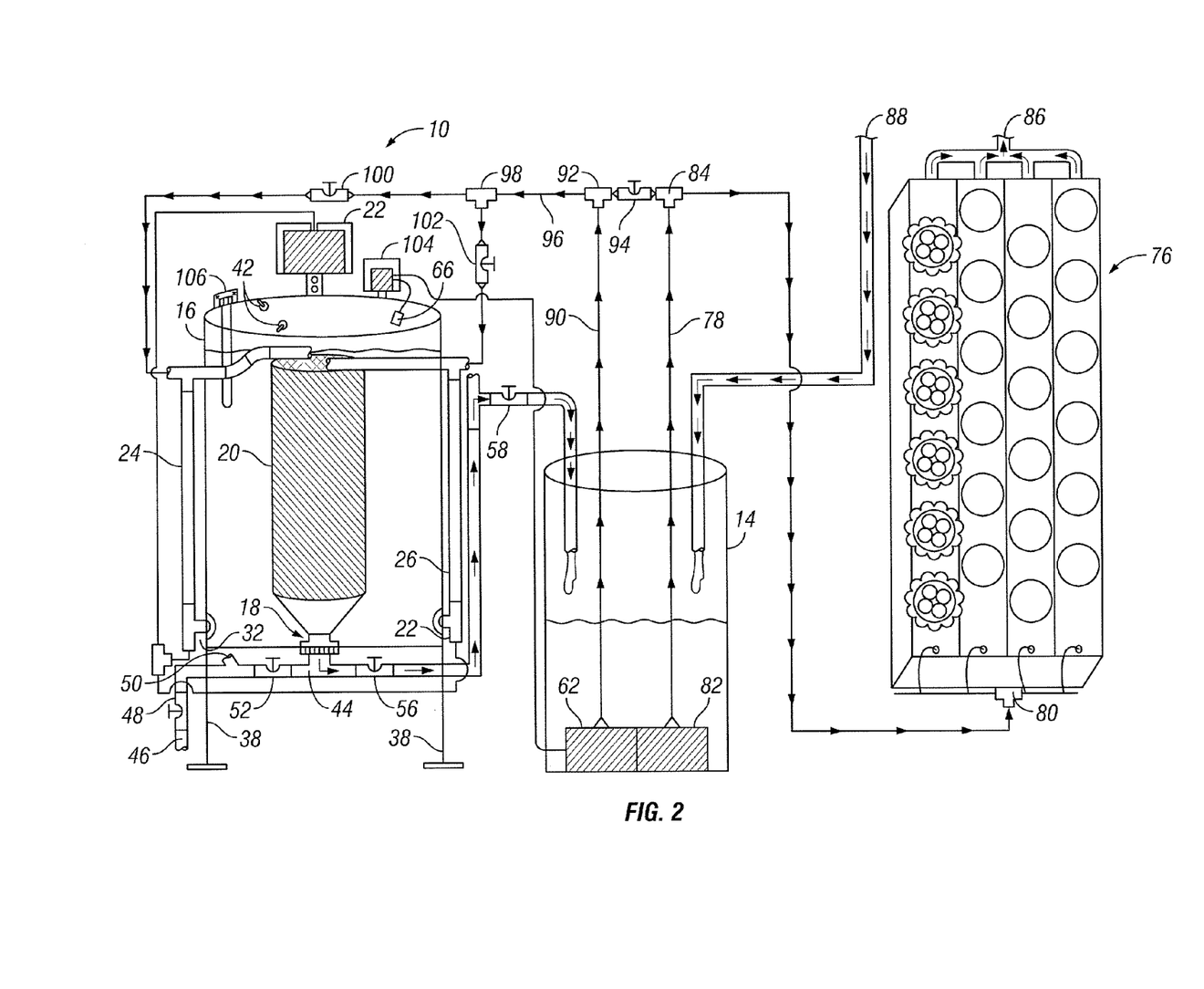
FIG. 2 is a diagrammatic view of a closed loop compost tea brewer showing a hydroponic feeding system according an embodiment of the disclosure.

FIG. 2 is a diagrammatical view of the compost tea brewing system connected with a hydroponic feed system 76 according to an embodiment of this disclosure. In the example shown, the hydroponic reservoir 14 has a tube 78 in fluid communication with an inlet port 80 of the hydroponic feed system 76. A pump 82 pumps liquid from the hydroponic reservoir 14 through the tube 78 into the inlet port 80 of the hydroponic feed system 76. In the example shown, the tube 78 has a first segment between the hydroponic reservoir 14 and a tee 84 and a second segment between the tee 84 and the inlet port 80 of the hydroponic feed system. The outlet 86 of the hydroponic feed system 76 is in fluid communication with a return tube 88 that flows into the hydroponic reservoir 14.

In this example, the pump 62 is in fluid communication with the tea brewing reservoir 16 through a pipe. As shown, the pump 62 is connected with a first segment and a tee 92. A valve 94 is connected between the tee 84 and tee 92 to control flow between the hydroponic reservoir 14 in the tea brewing reservoir 16. A second segment 96 is in fluid communication between tee 92 and tee 98. The tee 98 splits flow between the first aerating pipe 24 and the second aerating pipe 26. The flow from the tee 98 to the first aerating pipe 24 is controlled by a valve 100. The flow from the tee 98 to the second aerating pipe 26 is controlled by a second valve 102. Accordingly, the relative flow rate into the first aerating pipe 24 and the second aerating pipe 26 can be controlled by the valves 100, 102. As shown in FIG. 1, a level switch 66 is configured to turn off the pump 62 if the level of liquid within the tea brewing reservoir 16 rises to the level of the level switch 66 to prevent overflow. For example, a control circuit 104, which may include a relay, could be used to turn off the pump 62 if the level within the tea brewing reservoir 16 rises to the level of the level switch 66. In the example shown, the compost tea brewing assembly 12 includes a heating element 106 which may be used to control the temperature of the liquid within the tea brewing reservoir 16.

Figure 3:
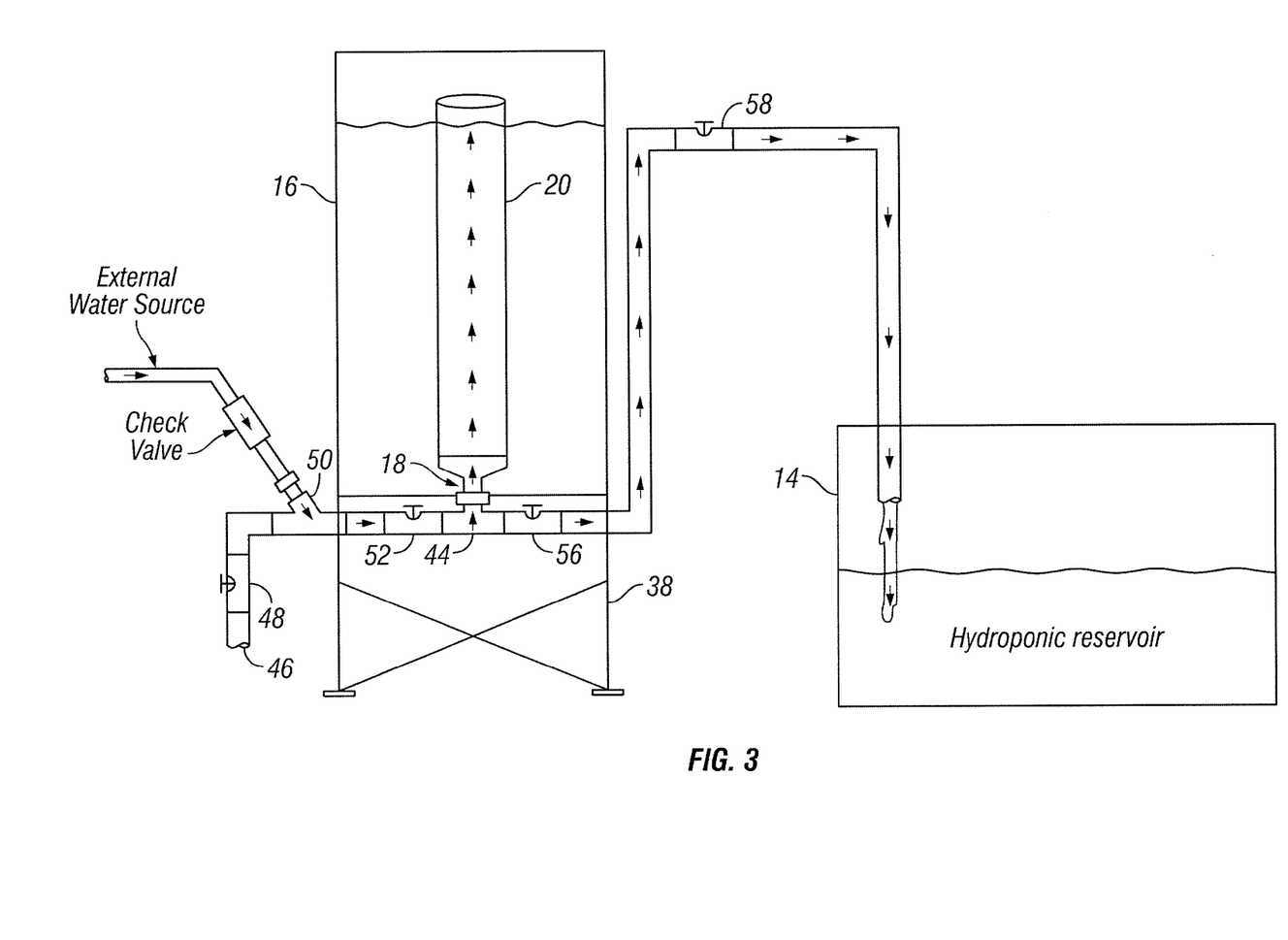
FIG. 3 is a diagrammatic view of an example closed loop compost tea brewer set up to fill the system with water according to an embodiment of the disclosure.

FIG. 3 is a diagrammatic view that shows the hydroponic reservoir 14 and tea brewing reservoir 16 being filled by an external water source. In this example, the discharge valve 48 would be in the closed position while valves 52, 56, 58 would initially be in the open position. With the inlet port 50 connected with an external water source, the water will flow into the inlet port 50 through the pipe into the hydroponic reservoir 14 and the tea brewing reservoir 16. Once the level within the hydroponic reservoir is sufficient, valves 56, 58 could be closed. At this point, the flow would be entirely into the tea brewing reservoir 16. Once the tea brewing reservoir 16 is at a desired level, the external water source could be turned off and disconnected from the inlet port 50 and close valve 52.

Figure 4:
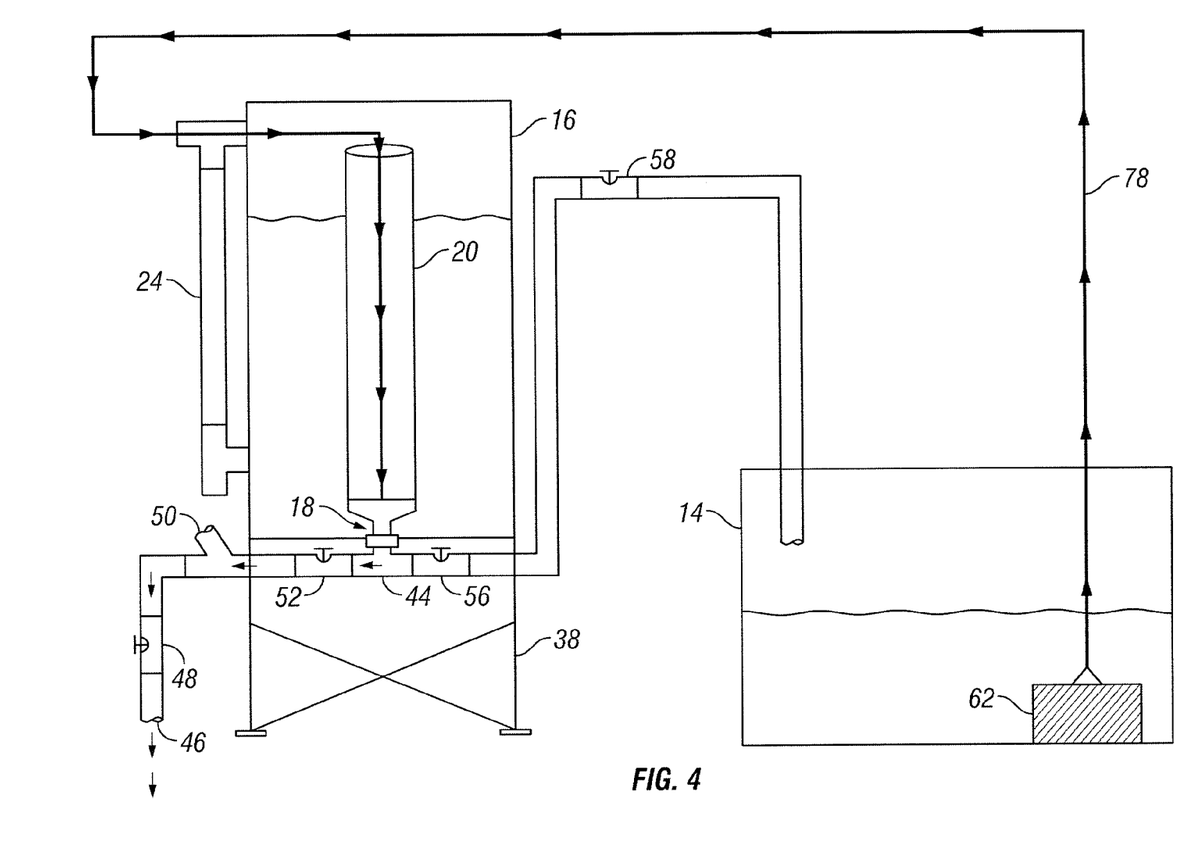
FIG. 4 is a diagrammatic view of an example compost tea brewer system set up to discharge water (or other nutrient-enhanced liquid) in the system according to an embodiment of the disclosure.

FIG. 4 shows a diagrammatical view of the compost tea brewing system 10 in a discharge arrangement to remove the liquid from the hydroponic reservoir 14 and the tea brewing reservoir 16. In this example, the discharge valve 48 would be in the open position; likewise, the inlet valve 52 would be in the open position. Valves 56, 58 would be in the closed position so that flow out of the port 18 flows in the pipe 44 out the discharge end 46. Accordingly, liquid in the tea brewing reservoir 16 will flow by hydrostatic force out the port 18 through the pipe 44 out the discharge end 46. The pump 62 can be used to pump liquid out of the hydroponic reservoir 14 into the tea brewing reservoir 16, which will be discharged out the discharge end 46 as explained above. In this manner, the liquid in both the hydroponic reservoir 14 and the tea brewing reservoir 16 can be emptied in an easy manner. With the liquid drained, filter 20 could be removed and compost that has settled to the bottom of the tea brewing reservoir 16 could be flushed out through port 18, such as by spraying the tea brewing reservoir with water. The compost will be flushed out through discharge end 46.

Figure 5:
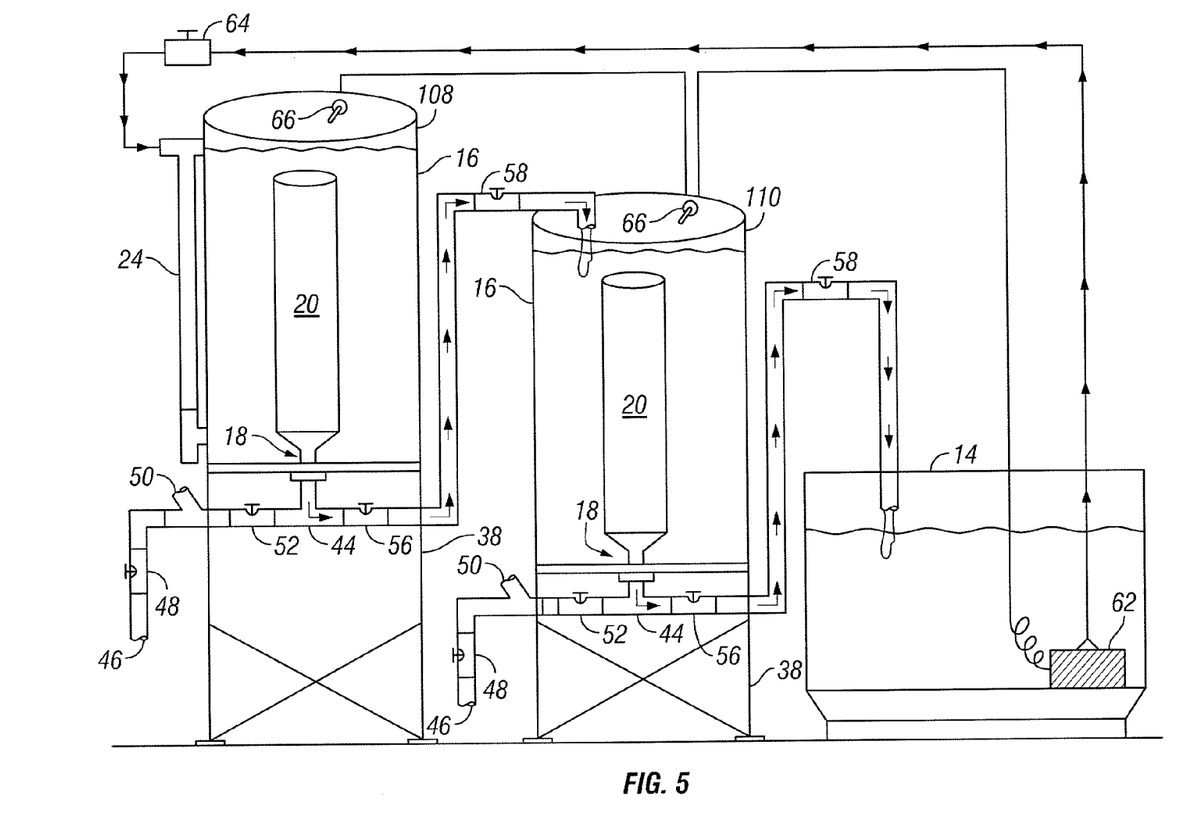
FIG. 5 is an example closed loop compost tea brewer system with multiple tea brewers staged in series according to an embodiment of the disclosure.

FIG. 5 shows an embodiment of the compost tea brewing system 10 with multiple compost tea brewing assemblies connected together. In the example shown, there is a first compost tea brewing assembly 108 and a second compost tea brewing assembly 110, but one skilled in the art should appreciate that more than two compost tea brewing assemblies may be connected together to increase the capacity of compost tea that is being produced. In this example, the first compost tea brewing assembly 108 is connected such that pipe 44 flows into the reservoir 16 of the second compost tea brewing assembly 110. The tea from the second compost tea brewing assembly in turn flows into the hydroponic reservoir 14. The liquid in the hydroponic reservoir 14 is pumped via pump 62 into the first compost tea brewing assembly 108 to form the closed loop arrangement. If additional compost tea brewing assemblies were added to this system, the return from the hydroponic reservoir 14 would flow into the first (most upstream) of the compost tea brewing assemblies.

Figure 6:
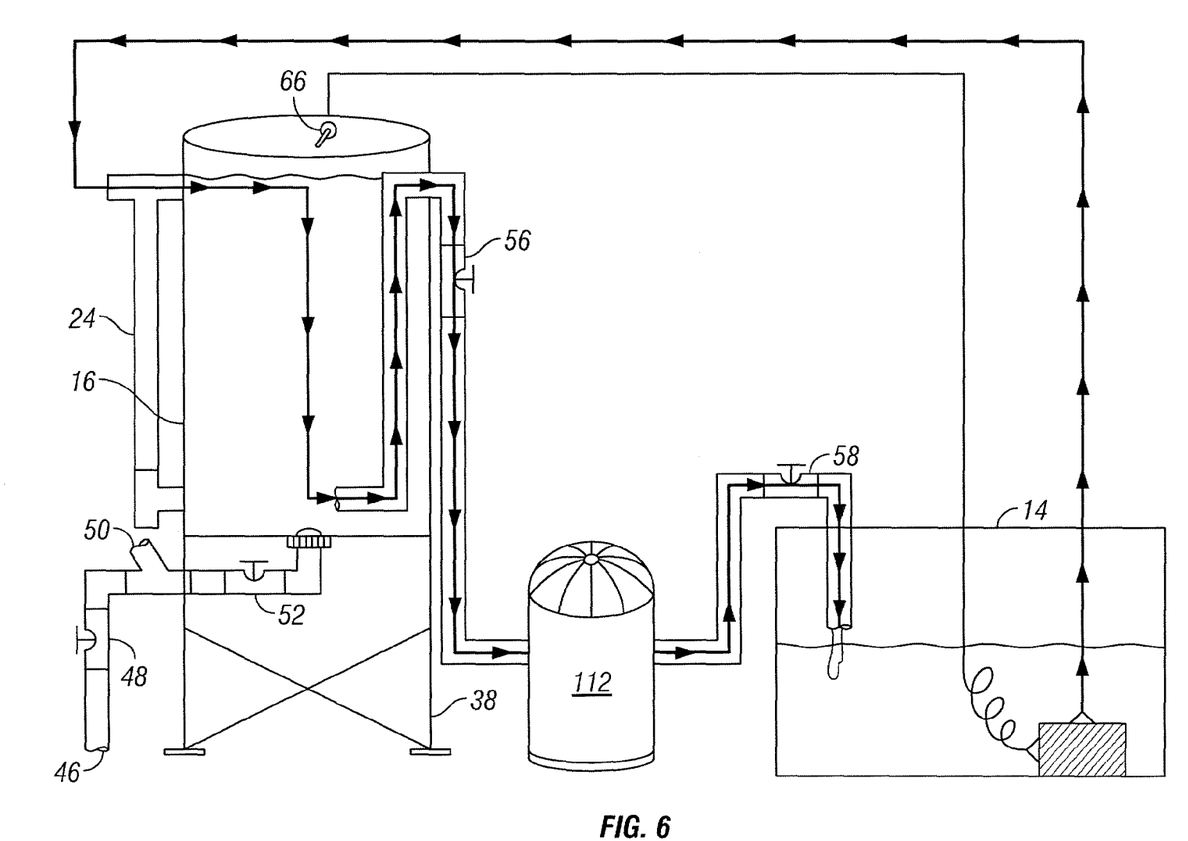
FIG. 6 is an example closed loop compost tea brewer system with a sand filter according to an embodiment of the disclosure.

FIG. 6 shows an embodiment of the compost tea brewing system 10 in which the flow between the compost tea brewing assembly 12 and the hydroponic reservoir 14 flows through a sand filter 112. The sand filter 112 could be used in lieu of (or in addition to) the filter 20 that is housed inside the tea brewing reservoir 16 (see e.g., FIGS. 1 and 2) and other embodiments.

Figure 7:
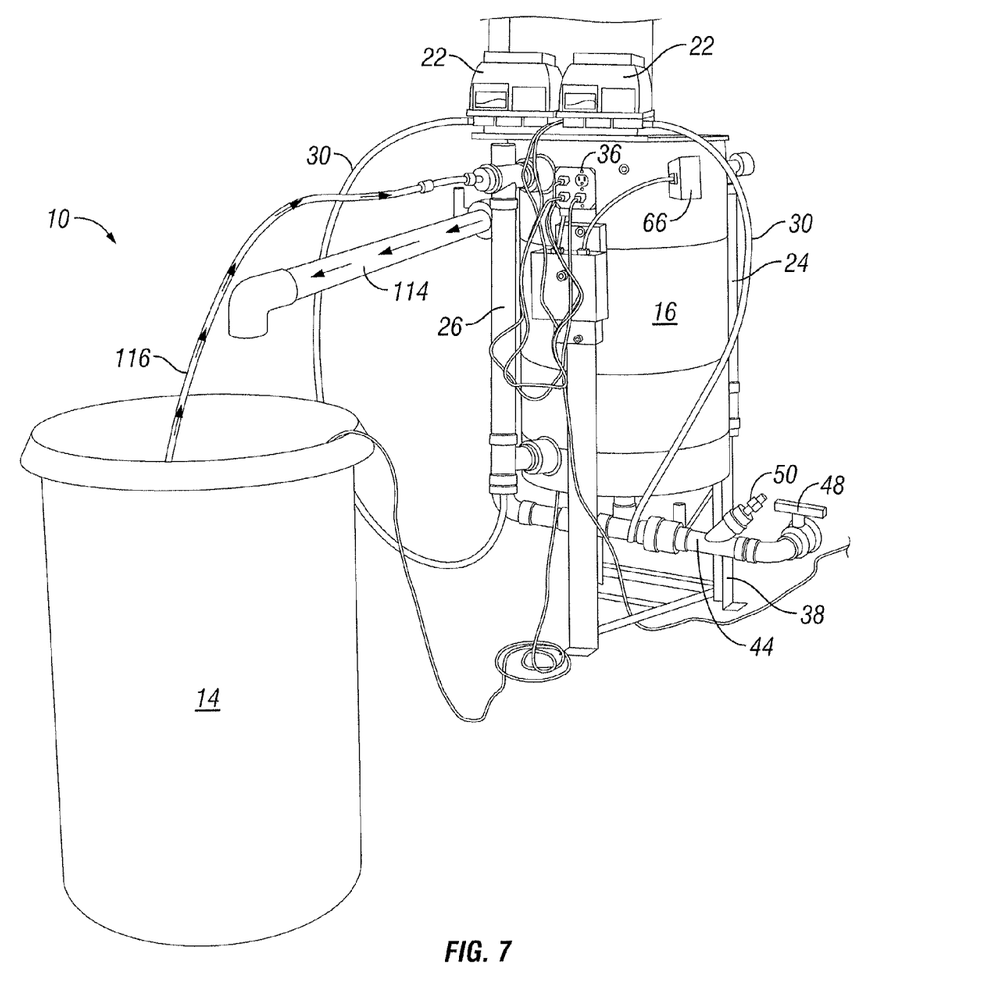
FIG. 7 is a side perspective view of an example closed loop compost tea brewer system according to an embodiment of the disclosure.

Referring to FIG. 7, there is shown an example perspective view of a system employing the closed loop aspect of the compost tea brewing system 10. In this example, the tea brewing reservoir 16 includes an outlet pipe 114 that dispenses tea into the hydroponic reservoir 14. A pump (not shown in this view) within the hydroponic reservoir 14 pumps liquid out of the hydroponic reservoir 14 through a tube 116 into the tea brewing reservoir 16. In this example, two air pumps 22 pump air through tubes 30 into pipes 24, 26, which aerates the liquid within the tea brewing reservoir 16. However, one skilled in the art should appreciate that a single air pump could be used if desired in some circumstances.

Figure 8:
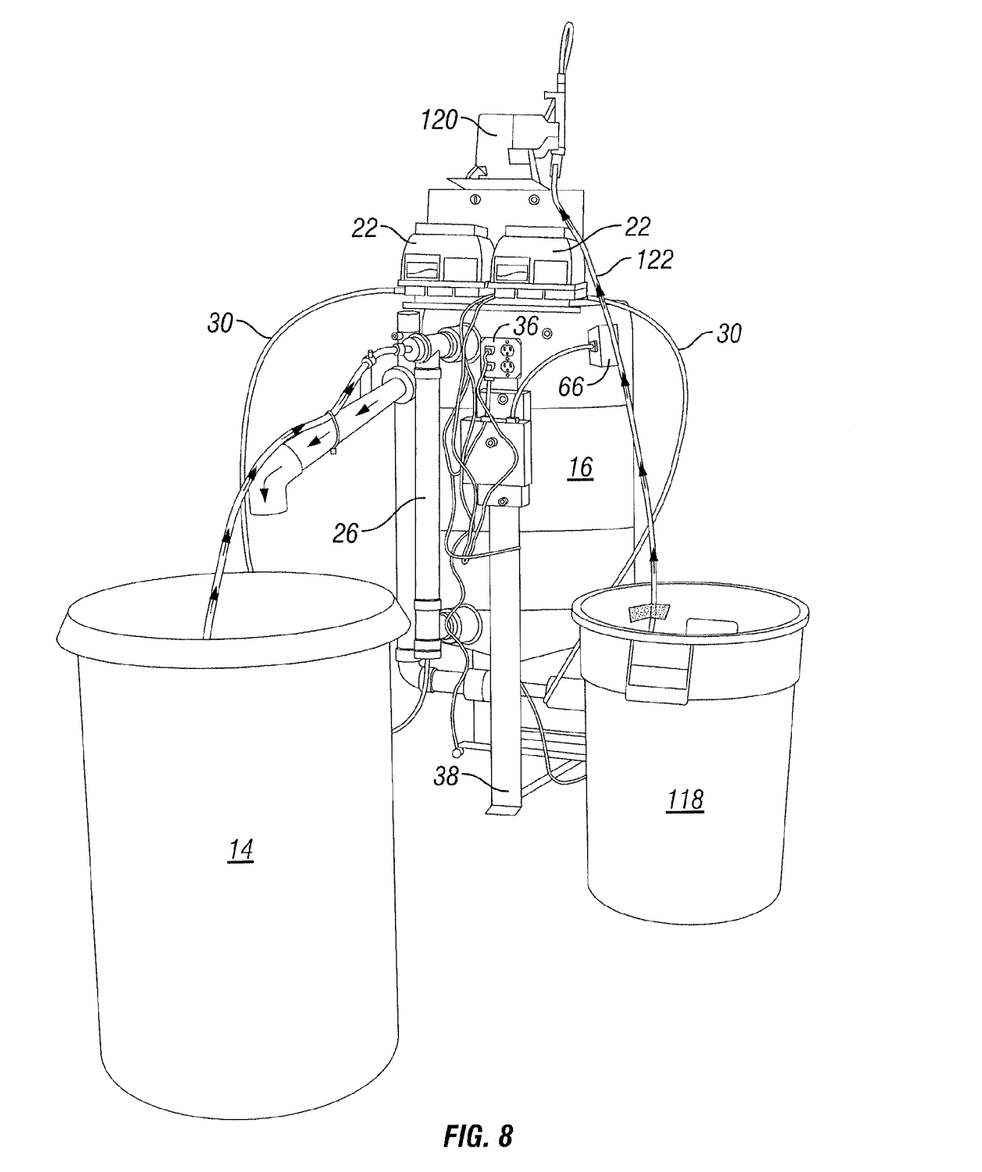
FIG. 8 is an example closed loop compost tea brewer system with an injector system according to an embodiment of the disclosure.

FIG. 8 shows the example system from FIG. 7 with an injection assembly. In this example, there is shown an injection reservoir 118 that is in fluid communication with an injection pump 120 via a tube 122. This injects additives into the tea brewing reservoir 16 as desired. In some embodiments, a control circuit may be used to control the injections into the tea brewing reservoir 16 on a timed schedule as desired. Injection pump 120 could be fluidly connected to one or both of aerator pipes 24, 26.

Figure 9:
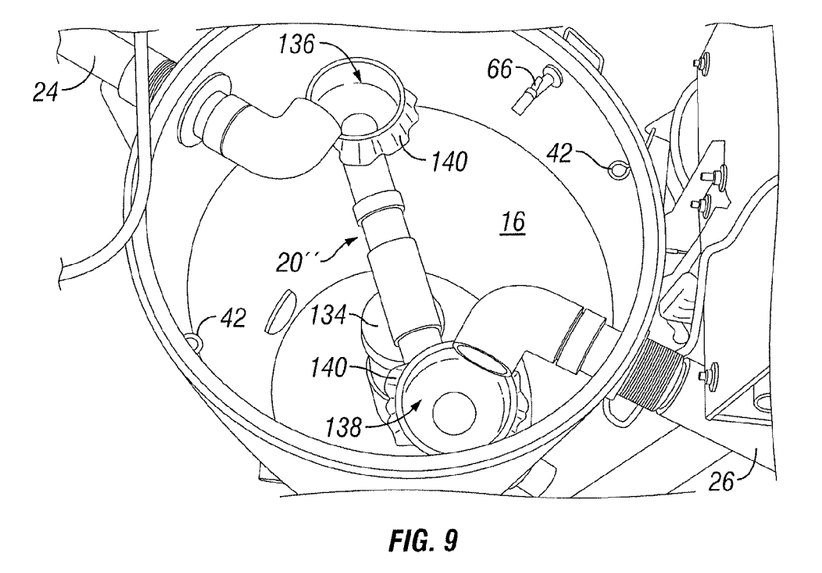
FIG. 9 is a top perspective view of an example tea brewer reservoir that could be used in the system according to an embodiment of the disclosure.
Figure 10:
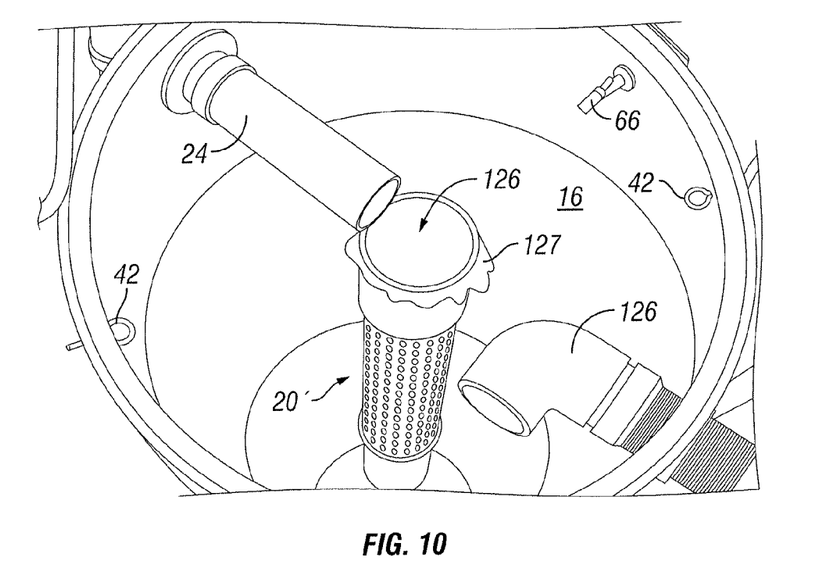
FIG. 10 is a top perspective view of an example tea brewer reservoir according to another embodiment of the disclosure.
Figure 11:
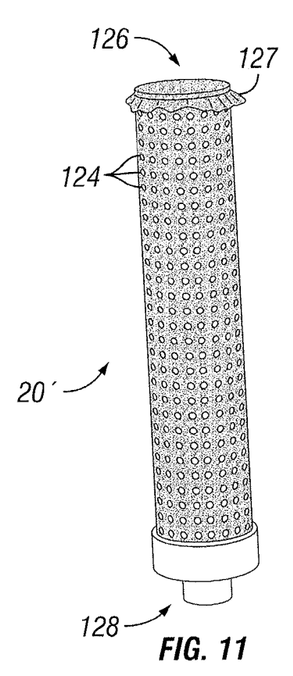
FIG. 11 is a side perspective view of an example filter that could be used in a compost tea brewer according to an embodiment of the disclosure.
Figure 12:
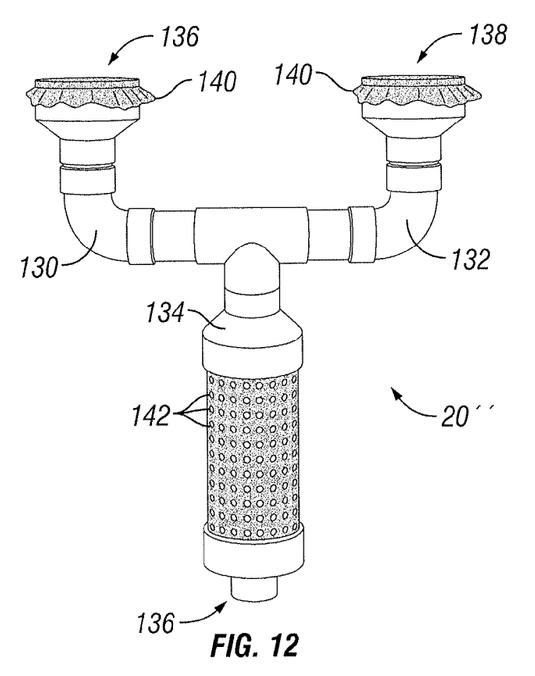
FIG. 12 is a side perspective view of another example filter that could be used in conjunction with the system according to another embodiment of the disclosure.

FIGS. 9 and 10 are top views of the tea brewing reservoir 16 showing alignment of the aerating pipes 24, 26 with respect to the filter 20. A first embodiment of the filter 20 is shown in FIG. 11 as reference number 20' and a second embodiment of the filter 20 is shown in FIG. 12 as reference number 20". In the first embodiment, 20', the filter 20 has a hollow, cylindrical body with a multiplicity of holes 124 into which liquid in the tea brewing reservoir 16 can flow. As shown, the cylindrical body includes an opened top end 126 and a bottom end 128 with a reduced diameter to fit into the port 18. The openings in the filter 20' are covered with a screen 127 that prevents debris and other particulate that has a bigger size than the holes in the screen 127 from getting into the filter 20'. In the second embodiment of the filter 20", the filter includes a first branch 130 and a second branch 132 that terminate into a third branch 134. The third branch 134 terminates in a lower end 136, which has a reduced diameter in this embodiment, which fits into the port 18. In the example shown, both the first branch 130 and second branch 132 include an open end 136, 138 that is covered with a screen 140 that allows liquid to flow into the filter but prevents particulate suspended within the liquid that has a larger size than holes in the screen from entering the filter 20". As shown, the third branch 134 includes a cylindrical wall with a multiplicity of openings 142 that are also covered with a screen to prevent particulate from entering the filter. Referring back to FIGS. 9 and 10, the aerating pipes 24, 26 are arranged in FIG. 9 to disperse liquid over the top ends 136, 138 of the first branch 130 and second branch of the filter 20". In FIG. 10, the first aerating pipe 24 is positioned to dispense liquid over the top end 126 of the filter 20' to prevent particulate from building up in this area of the filter. These pipes could be configured in a number of different ways depending upon the circumstances.

Figure 13:
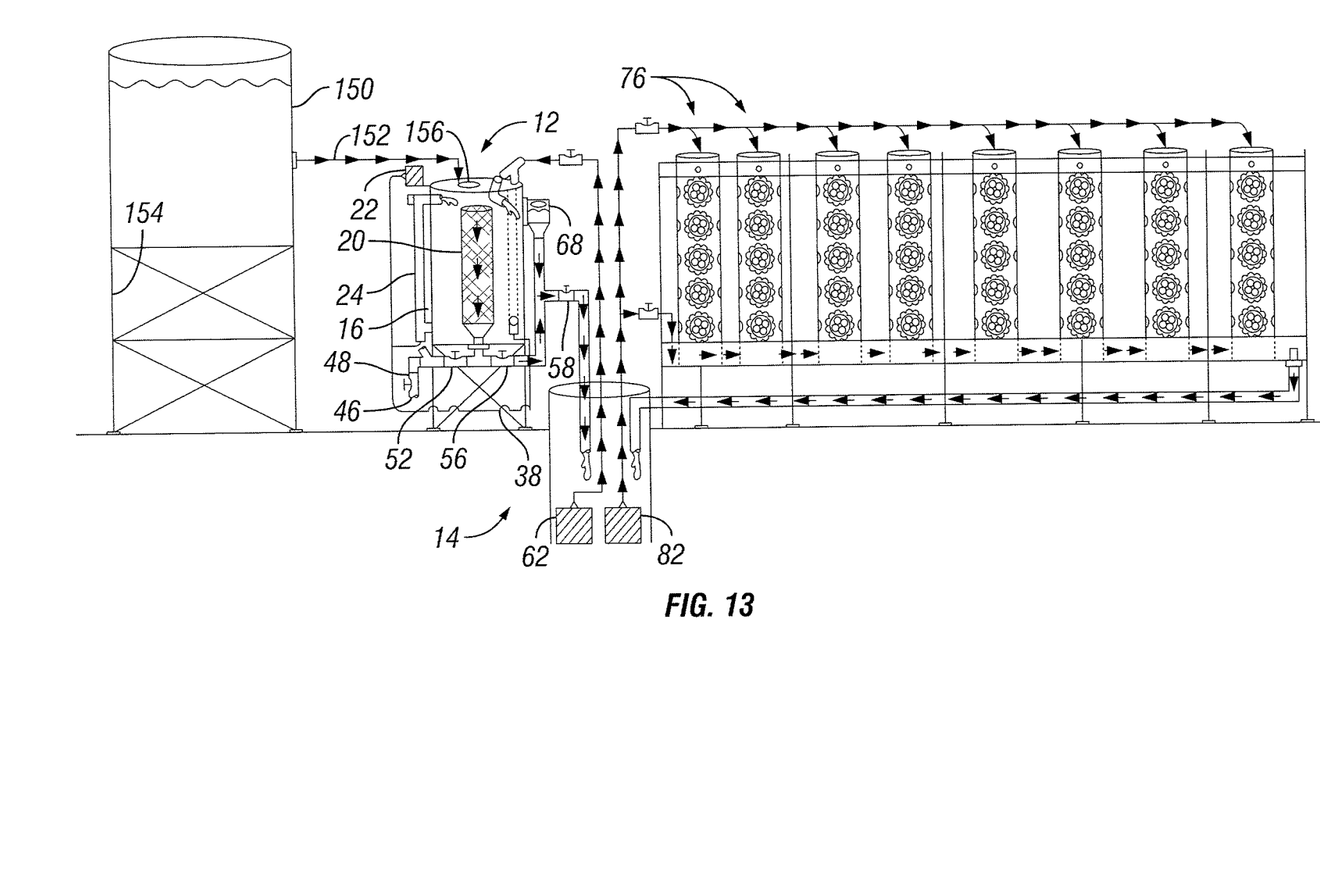
FIG. 13 is a diagrammatic view of an example closed loop compost tea brewer system using a rain collection tank according to an embodiment of the disclosure.

FIG. 13 shows an embodiment using a rain water collection tank 150 to conserve consumption of water. In this example, the rain water collection tank 150 collects and stores rain water for supply to the tea brewing reservoir 16. For example, there is a fluid connection, such as a pipe 152, between the rain water collection tank 150 and the tea brewing reservoir 16. As shown, the rain water collection tank 150 is suspended above the ground using a stand 154 to be elevated compared with the tea brewing reservoir 16. With this arrangement, water in the rain water collection tank 150 may be gravity fed to the tea brewing reservoir 16. However, embodiments are contemplated in which a pump could be used to supply water in the rain water collection tank 150 in circumstances where a gravity fed arrangement is not possible or desirable.

A valve 156, which could be a float, controls flow of water from the rain water collection tank 150 to the tea brewing reservoir 16. If the valve 156 were a float, for example, the valve would open based on a fluid level within the tea brewing reservoir 16. One skilled in the art should appreciate that the valve 156 could be mechanical and/or electronically controlled.

Figure 14:
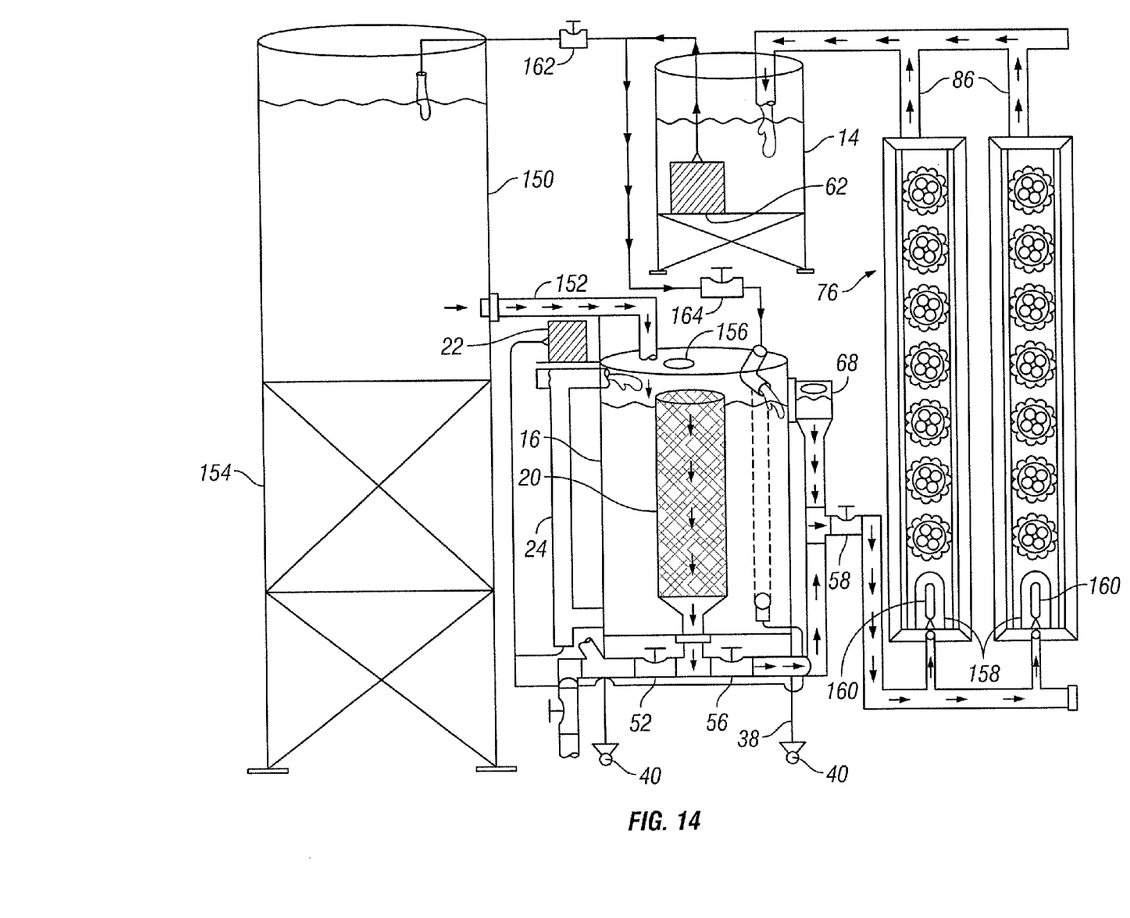
FIG. 14 is a diagrammatic view of the example compost tea brewer system shown in FIG. 13 with a hydroponic feed system using a water conservation device.
Figure 15:
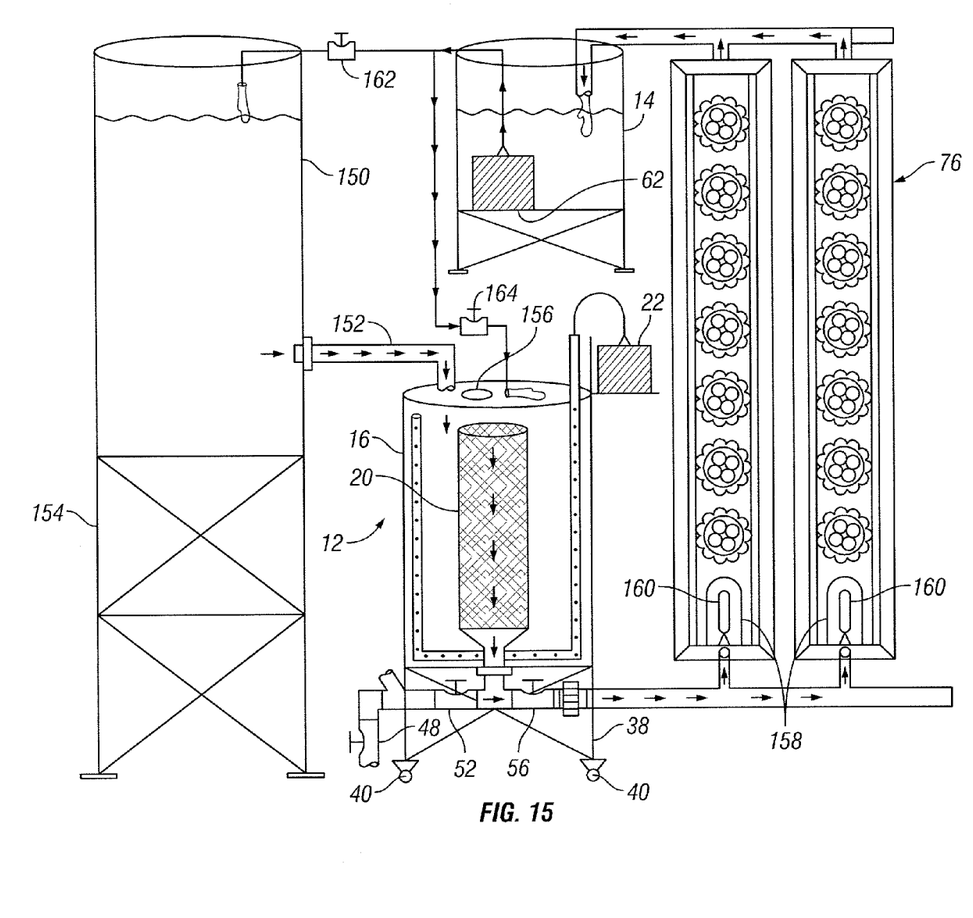
FIG. 15 is a diagrammatic view of an example compost tea brewer system with an aerating assembly according to another embodiment.

FIGS. 14 and 15 show an embodiment in which the hydroponic feed system 76 includes a receptacle 158 for holding a quantity of nutrient enriched liquid and a valve 160 controls flow from the tea brewing reservoir 16 to the receptacle. In some embodiments, the valve 160 may be a float that opens when the liquid within the receptacle falls to a level that additional nutrient enriched liquid needs to be added from the tea brewing reservoir 16. In this example, the outlet 86 of the hydroponic feed system 76 is gravity fed into the hydroponic reservoir 14, which pumps liquid within the hydroponic reservoir 14 to the rain water collection tank 150 and tea reservoir 16 using pump 62. A valve 162 controls flow between the hydroponic reservoir 14 and the rain water collection tank 150. If this valve 162 is closed the fluid will flow into the tea brewing reservoir unless valve 164 is closed. If this valve 164 is closed, no fluid will be pumped out of the hydroponic reservoir 14.

Depending on the circumstances, the compost tea brewing assembly 12 could be equipped with one or more electronic valves. For example, valve 58 could be configured to be electronically controlled through the circuitry of the pumps 62 and 82 (FIG. 13). By way of example, in some embodiments, pump 82 could be cycled on and off based on a timed schedule, detected nutritional needs (or other criteria) to conserve energy. For example, pump 82 could be configured to run 12 hours and then be off for 12 hours to conserve energy. In some embodiments, pump 82 could be configured to turn on and off every hour equaling a 12 hour on, 12 hour off run cycle. These example timed schedules are provided for purposes of example only and are not intended to limit the specific timed schedule, which could vary depending on the circumstances. In some embodiments, pump 62 and valve 58 could be wired so that pump 62 will also turn on and off in unison with pump 82 and valve 58 will open and close on demand when pump 82 and pump 62 turn on and off during run cycle determined. This type of embodiment could be achieved by having circuitry of pump 82, pump 62, and valve 58 wired in unison. When the run cycle is in the off position, the closed loop compost brewer will no longer circulate compost tea back to reservoir 14. Since valve 58 is in the closed position, this will allow the closed loop compost brewer to brew compost tea within the brewer housing 16. By doing so, the compost and compost tea can still acquire all stages of fermentation and decomposition within the brewer housing 16. This helps in preserving energy during run cycle operation. Pump 62 will only run 12 hours on and 12 hours off in this type of hydroponic grow system. Each grow system will be unique in its own character, the closed loop compost brewer will be fitted to meet each grow system on an individual basis as one unit through the closed loop scheme and the electrical circuitry of pumps within the reservoir 14 and valve 58 on the closed loop compost brewer. However, embodiments are also contemplated in which pumps 62, 82 could operate independently.

Depending on each individual hydroponic grow system and type of plants grown in the system, different combinations of nutrients will be required. All plants require their own ration of nutrients for full growth complement. A typical hydroponic grow system has an electrical circuit board or "brain" to control the nutrient ratios required. In some cases, probes are wired to the circuit board to monitor water conditions such as pH level and/or nutrient content. Embodiments are contemplated in which probes could be placed in the compost tea brewing assembly 12 and/or the hydroponic reservoir 14 to monitor water. The probes are typically designed to communicate to the circuit board; the circuit board controls all the injectors from which nutrients are drawn (as discussed above with respect to FIG. 8). In some embodiments, compost tea brewing assembly 12 could be integrated so that pump 62 and valve 58 will also be controlled through the circuitry board of the hydroponic grow system. For example, pump 62 and valve 58 could open and close on demand as nutrients are needed. With such an arrangement, the correct ratio of nutrients can be obtained. When the correct ratio has been acquired, valve 58 will close and pump 62 would be shut off, the compost tea brewing assembly 12 will brew within its own housing 16 until demand is called to supply more nutrients to water. When demand is called, the control circuit would open valve 58 and pump 62 will turn on and cycle nutrient rich water to reservoir 14 to complete the closed loop scheme. In some embodiment, multiple injectors could be installed on the compost tea brewing assembly 12 to inject the correct ratio within the tea brewing reservoir 16. This will complement the already nutrient rich compost and add value to the compost tea when delivered to grow system. This method is advantageous for optimum growth of plants and will also conserve on nutrients used during duration of the growth cycle. Injections of other nutrients will be plant specific and used as a complement to the already nutrient rich compost tea. In this scenario, valve 58 would typically be electronic for open and close operations to be controlled through the circuit board of the hydroponic grow system.

In operation, the user would first fill the hydroponic reservoir 14 and tea brewing reservoir 16 to a desired level. This could be done, for example, by hooking up an external water source to the inlet port 50. Prior to hooking up an external water source, the user would adjust the valves such that the discharge valve 48 is in the closed position, but the valves 52, 56 and 58 are in the open position. This will allow the water to flow through the pipe 44 into the hydroponic reservoir and tea brewing reservoir 16. Once the level is sufficient within the hydroponic reservoir 14, valve 58 could be closed. At this point, with the valve 52 open, the tea brewing reservoir 16 would continue to fill until it reaches the desired level. Once this level is reached, the external water source could be turned off and disconnected. At the same time, the valve 52 should be closed. The user would then turn on the pump 62 in the hydroponic reservoir to create a closed loop flow from the hydroponic reservoir 14 to the tea brewing reservoir 16. Valve 64 could be adjusted to obtain a desired flow rate to the tea brewing reservoir 16. Valves 56, 58, 74 are adjusted to create flow via hydrostatic pressure from the tea brewing reservoir 16 into the hydroponic reservoir 14. The flow rate from the tea brewing reservoir 16 to the hydroponic reservoir 14 could be adjusted to a desired flow rate using valves 56, 58, 74. As discussed above, a level switch 66 controls the flow of the pump 62 to prevent overflow of the tea brewing reservoir 16. The air pump 22 could be turned on to aerate liquid in the tea brewing reservoir 16. The user would then put compost into the tea brewing reservoir 16. This could be done without any bag (e.g., free-floating within the water in the tea brewing reservoir 16), or the compost could be placed within a tea bag in the reservoir 16. Either way, this will enhance the liquid within the tea brewing reservoir, which will flow into the hydroponic reservoir. When the user wishes to feed plants in a hydroponic system, the hydroponic reservoir 14 could be hooked up in a normal manner to a hydroponic feed system.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A closed loop compost tea brewing system comprising:
a hydroponic reservoir dimensioned to hold a quantity of fluid, wherein the hydroponic reservoir includes an inlet and an outlet;
a compost tea brewing assembly configured to brew compost tea, wherein the compost tea brewing assembly includes a tea brewing reservoir containing a quantity of compost and is dimensioned to hold a quantity of fluid and has an inlet and an outlet, wherein the outlet of the tea brewing reservoir is fluidly connected to the inlet of the hydroponic reservoir, wherein the inlet of the tea brewing reservoir is fluidly connected to the outlet of the hydroponic reservoir, wherein the fluid connection of the outlet of the hydroponic reservoir is a direct fluid connection to the inlet of the tea brewing reservoir without any intervening operating structures;
at least one pump configured to recirculate liquid from the outlet of the hydroponic reservoir into the inlet of the tea brewing reservoir;
a level switch associated with the tea brewing reservoir configured to control actuation of the at least the one pump to prevent a fluid level within the tea brewing reservoir from rising above a predetermined level; and
wherein the at least one pump and the level switch operate together to continuously recirculate fluid between the hydroponic reservoir and the tea brewing reservoir.

2. The system as recited in claim 1, wherein the tea brewing reservoir is arranged with respect to the hydroponic reservoir to dispense compost tea into the hydroponic reservoir using hydrostatic pressure.

3. The system as recited in claim 1, wherein the tea brewing reservoir includes a bottom wall defining a port, wherein the port is in fluid communication with the hydroponic reservoir.

4. The system as recited in claim 3, further comprising a filter coupled with the port, wherein the filter is configured to block certain particulate from entering the port.

5. The system as recited in claim 4, wherein the filter includes a cylindrical shaped portion with a circumferential side wall having a plurality of holes.

6. The system as recited in claim 5, wherein the filter includes a first branch and a second branch extending from and in fluid communication with the port.

7. The system as recited in claim 1, further comprising a skimmer in fluid communication with the tea brewing reservoir.

8. The system as recited in claim 1, further comprising an air pump in fluid communication with the tea brewing reservoir.

9. The system as recited in claim 8, wherein the compost tea brewing assembly includes at least one aerating pipe providing fluid communication between the air pump and the tea brewing reservoir.

10. The system as recited in claim 1, further comprising a valve for controlling fluid flow from the tea brewing reservoir to the hydroponic reservoir.

11. The system as recited in claim 1, further comprising a valve for controlling fluid flow from the hydroponic reservoir to the tea brewing reservoir.

12. A closed loop compost tea brewing system comprising:
- a hydroponic reservoir;
- a compost tea brewing assembly configured to brew compost tea, wherein the compost tea brewer assembly includes a tea brewing reservoir containing a quantity of compost;
- a closed loop arrangement fluidly connecting the tea brewing reservoir and the hydroponic reservoir, wherein the closed loop arrangement is configured to provide continuous fluid flow directly from the tea brewing reservoir to the hydroponic reservoir and recirculate fluid from the hydroponic reservoir directly back to the tea brewing reservoir;
- at least one pump configured to recirculate liquid from the hydroponic reservoir to the tea brewing reservoir;
- a level switch associated with the tea brewing reservoir configured to control actuation of the at least the one pump to prevent a fluid level within the tea brewing reservoir from rising above a predetermined level; and
- wherein the at least one pump and the level switch operate together to continuously recirculate fluid between the hydroponic reservoir and the tea brewing reservoir.

13. The system as recited in claim 12, wherein the tea brewing reservoir is arranged with respect to the hydroponic reservoir to dispense compost tea into the hydroponic reservoir using hydrostatic pressure.

14. The system as recited in claim 12, wherein the compost tea brewing assembly includes a plurality of tea brewing reservoirs.

15. The system as recited in claim 12, further comprising a platform on which the tea brewing reservoir is suspended, wherein the platform includes a plurality of wheels.

16. A closed loop compost tea brewing system comprising:
- a compost tea brewing assembly configured to brew compost tea, wherein the compost tea brewer assembly includes a tea brewing reservoir containing a quantity of compost, the tea brewing reservoir having an inlet and an outlet;
- a hydroponic feed system having an inlet and an outlet, wherein the inlet of the hydroponic feed system is in fluid communication with the outlet of the tea brewing reservoir to supply compost tea to the hydroponic feed system, wherein the outlet of the hydroponic feed system is in fluid communication with the inlet of the tea brewing reservoir to recirculate fluid from the hydroponic feed system to the tea brewing assembly;
- wherein the fluid communication between the outlet of the tea brewing reservoir and the inlet of the hydroponic feed system is a direct connection;
- wherein the fluid communication between the outlet of the hydroponic feed system and the inlet of the tea brewing reservoir is a direct connection;
- at least one pump configured to recirculate liquid from the hydroponic feed system to the tea brewing reservoir;
- a level switch associated with the tea brewing reservoir configured to control actuation of the at least the one pump to prevent a fluid level within the tea brewing reservoir from rising above a predetermined level; and
- wherein the at least one pump and the level switch operate together to continuously recirculate fluid between the hydroponic feed system and the tea brewing reservoir.

17. The closed loop compost tea brewing system of claim 16, further comprising a rain water collection tank in fluid communication with the inlet of the tea brewing reservoir, further comprising a float valve configured to control flow between the rain water collection tank and the tea brewing reservoir, wherein the float valve is configured to open when a fluid level within the tea brewing reservoir falls below a threshold level and close when the fluid level within the tea brewing reservoir rises to the threshold level.

18. The closed loop compost tea brewing system as claim 16, further comprising a pump for supplying fluid from the tea brewing reservoir to hydroponic feed system, wherein the pump is controlled based on a timed schedule.

* * * * *